Dec. 24, 1940.  J. E. BORAH  2,226,215

SHIPPING BOX

Filed March 29, 1939  5 Sheets-Sheet 1

INVENTOR:
JOHN E. BORAH.
BY Oltsch & Knoblock
ATTORNEY.

Dec. 24, 1940.   J. E. BORAH   2,226,215
SHIPPING BOX
Filed March 29, 1939   5 Sheets-Sheet 2
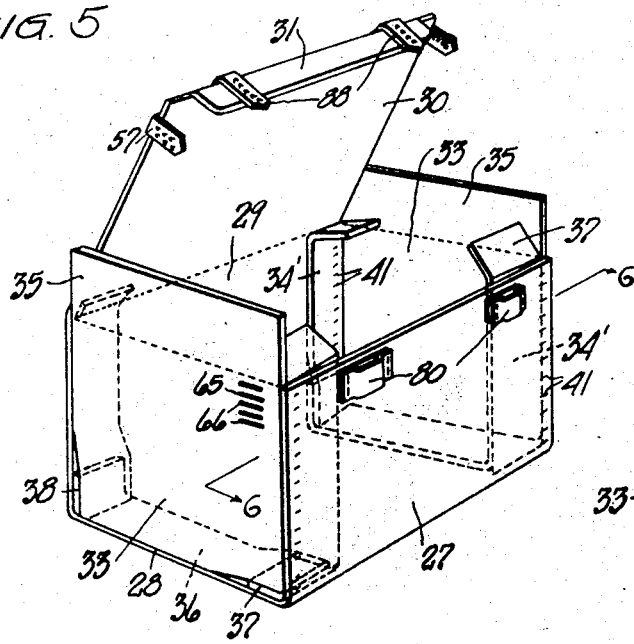
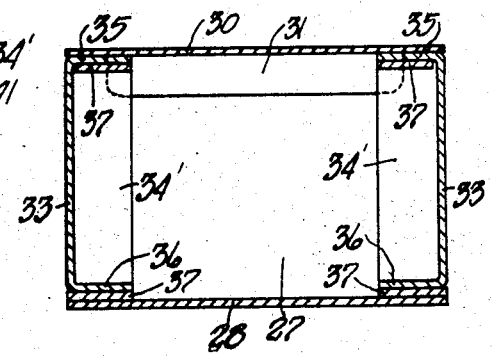
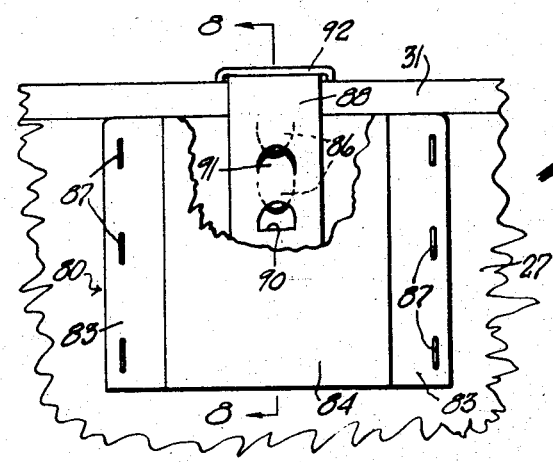
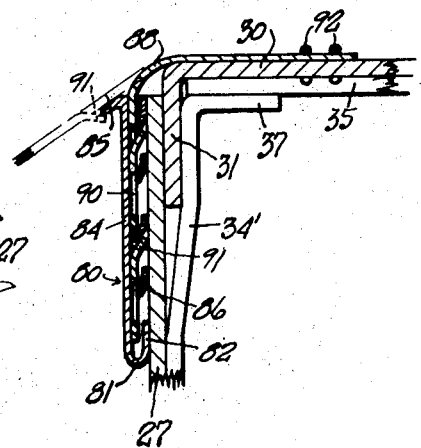
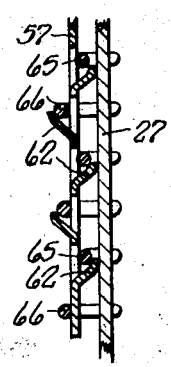
INVENTOR.
JOHN E. BORAH
BY
ATTORNEYS.

Dec. 24, 1940.   J. E. BORAH   2,226,215
SHIPPING BOX
Filed March 29, 1939   5 Sheets-Sheet 3
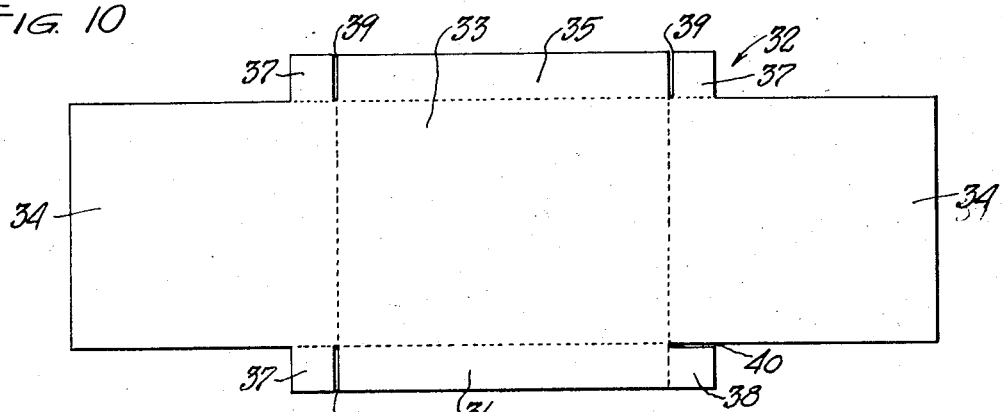
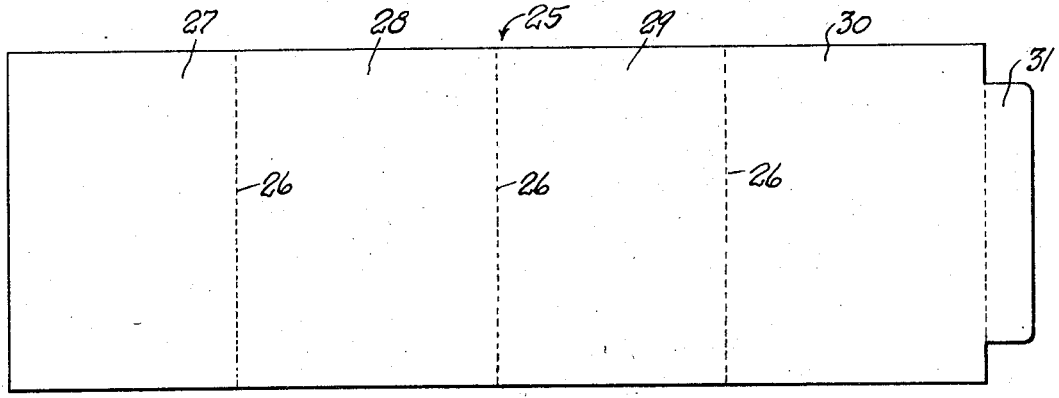
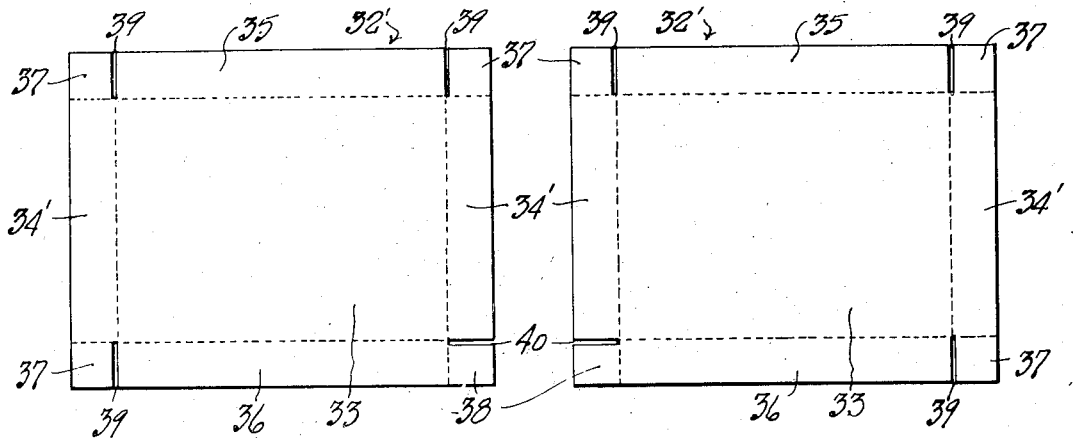
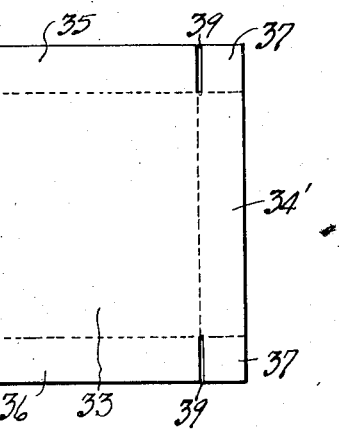
INVENTOR.
JOHN E. BORAH.
BY
ATTORNEYS.

Dec. 24, 1940.  J. E. BORAH  2,226,215
SHIPPING BOX
Filed March 29, 1939   5 Sheets-Sheet 4

INVENTOR.
JOHN E. BORAH
BY Oltsch & Knoblock
ATTORNEYS.

Dec. 24, 1940. J. E. BORAH 2,226,215
SHIPPING BOX
Filed March 29, 1939 5 Sheets-Sheet 5
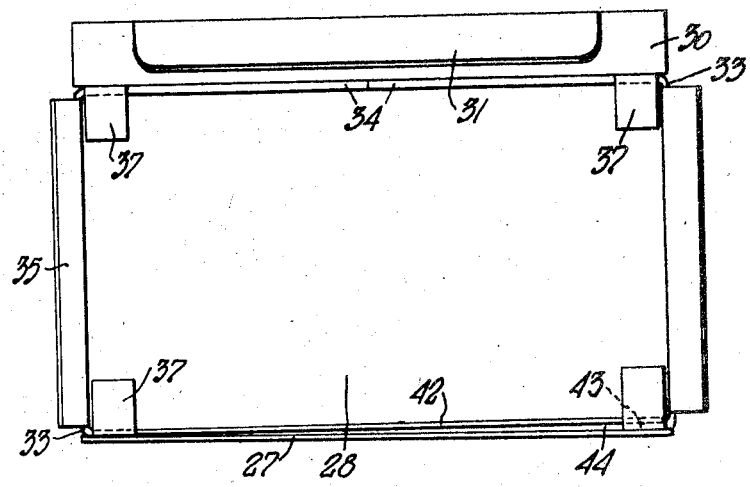
FIG. 20
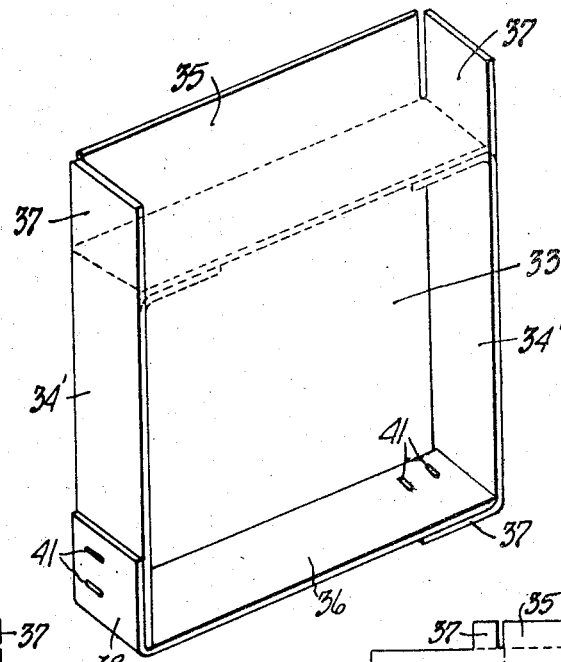
FIG. 21
FIG. 22
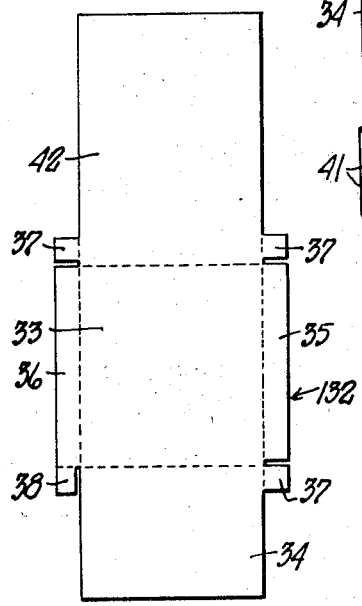
FIG. 23.
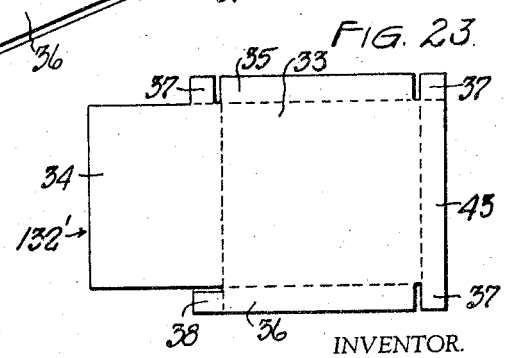
INVENTOR.
JOHN E. BORAH
BY Oltsch & Knoblock
ATTORNEYS.

Patented Dec. 24, 1940

2,226,215

UNITED STATES PATENT OFFICE 2,226,215

SHIPPING BOX

John E. Borah, Penn Township, St. Joseph County, Ind.

Application March 29, 1939, Serial No. 264,731

8 Claims. (Cl. 229—23)

This invention relates to improvements in shipping boxes, and particularly to boxes formed of fiber board, cardboard, corrugated paper board, kraft lined board, and the like.

At present, conventional shipping box construction and design commonly entails unbalanced board distribution. For example, double and triple board thicknesses occur at random, and at points where the same serve no purpose, leaving the most vital points of the container with only a single thickness. Present box practice thus relies upon the strength of the board itself to produce the needed degree of strength and rigidity, and entirely overlooks construction and design possibilities to achieve strength with board of lighter gauge than now utilized for obtaining any given degree of strength. This makes the boxes unnecessarily expensive because a material heavy enough to sustain the stress exerted at vital points, has more strength and rigidity than is needed at the other points of the box.

One of the outstanding examples of this unbalanced construction is the so-called "regular slotted container" which is made from a single blank folded to form end, back and front panels each having large projecting flaps which form the top and bottom. In this construction the flaps are arranged in double thickness substantially the entire extent of both top and bottom, while the vertical walls are all of single thickness. This renders the box expensive from the board consumption standpoint, and at the same time fails to provide reinforcement at the vertical walls which are the vital points of the box in connection with stacking, loading and handling thereof.

Likewise, the present three-piece box is quite unbalanced. In this construction two separate end blanks having narrow marginal stitching flanges entirely cut out at their corners, and a four panel main blank are employed, with said flanges stitched either at the outside of the main blank, or at the inner side thereof to extend outwardly, leaving all box sides of single thickness. The cut-outs in the stitching flanges weaken the structure, because the same form a V-shaped opening at each box corner and the corners are of single thickness and without reinforcement, no matter how the flanges are stitched. The stitching flanges do provide a narrow double thickness portion at end edges, but this is insufficient to provide the necessary rigidity to the major single thickness areas of the construction. Hence heavy liners are generally used to give rigidity, being applied at all vertical walls. This construction, with liners, unnecessarily increases board consumption, freight costs, and cost of manufacture, making an excessively high box cost for all users.

Another important disadvantage of present unbalanced box construction is the requirement for use therein of heavy fibre board and corrugated board, generally made from imported pulp. Domestic kraft lined board will withstand high bursting and bending stresses, and is light in weight, but lacks rigidity. Consequently, where boxes depend for rigidity on the material used, rather than on reinforced design and construction, the comparatively inexpensive kraft lined board cannot be used.

Another disadvantage of present box constructions lies in the difficulties in sealing them. Many containers have their tops sealed by stitching, but this entails lifting and manipulation of the heavily loaded container relative to the anvil of the stitching machine until all sides of the top flaps are stitched. Other sealing methods are equally inefficient. Thus a wire-bound box is subject to loosening of the wire or strap in handling, so that the wires may be slipped off and then replaced by pilferers, or the wires, if tightly applied, may damage both container and contents. An adhesive tape type of seal is obviously subject to easy pilferage.

It is therefore the primary object of my invention to provide a box construction wherein box strength and rigidity is derived from balanced or reinforcing board distribution.

A further object is to provide a rigid box construction which may be made from inexpensive board having comparatively low inherent rigidity.

A further object is to provide a box construction which has maximum strength but requires only a minimum amount of material and labor to manufacture and seal.

A further object is to provide a three piece box construction having novel end panels with marginal flanges connected to each other and to the main panel to form a rigid reinforcing frame for the box.

A further object is to provide a three piece box construction with novel end panels having integral flaps forming liners for reinforcing the long vertical box panels and flanges secured thereto and cooperating therewith to form a rigid box reinforcing framework.

A further object is to provide a three piece box with novel end panels having marginal stitching flanges and corner tabs, wherein three of said corner tabs are defined by parallel slits and the fourth by slit perpendicular to the others, to facilitate simultaneous folding of flanges, tabs and main blank during assembly.

A further object is to provide a rigidly reinforced box having smooth exterior surfaces throughout, and at the same time having an opening of full container size to facilitate packing thereof.

A further object is to provide a box having a top panel with a flange insertible between reinforcing flanges and the front wall to reinforce the box against bulging and hold the box top against inward thrust.

A further object is to provide a box with self-acting sealing means which cannot be opened and resealed without detection.

A further object is to provide novel self-acting sealing means for a shipping box.

A further object is to provide box sealing means which may be selectively temporarily sealed, or may be permanently sealed in a manner to expose release thereof.

Other objects will be apparent from the description and appended claims.

In the drawings:

Fig. 5 is a perspective view of another embodiment of my invention.

Fig. 6 is a vertical longitudinal sectional view taken on line 6—6 of Fig. 5.

Fig. 7 is a fragmentary elevation of another embodiment of box locking means, with parts broken away.

Fig. 8 is a fragmentary sectional view taken on line 8—8 of Fig. 7.

Fig. 9 is a fragmentary sectional view similar to Fig. 8 illustrating a modified type of locking arrangement.

Fig. 10 is a plan view of an end blank of the box illustrated in Fig. 1.

Fig. 11 is a plan view of the blank forming the top, back, bottom and front of the box.

Figs. 12 and 13 are plan views of the left and right end blanks, respectively, of the box illustrated in Fig. 5.

Fig. 20 is a top plan view of another modified form of box construction.

Fig. 21 is a perspective view illustrating the blank of Fig. 12 in folded form.

Figs. 22 and 23 are plan views of the blanks forming the left and right end blanks, respectively, of the box construction illustrated in Fig. 20.

Figure 1:
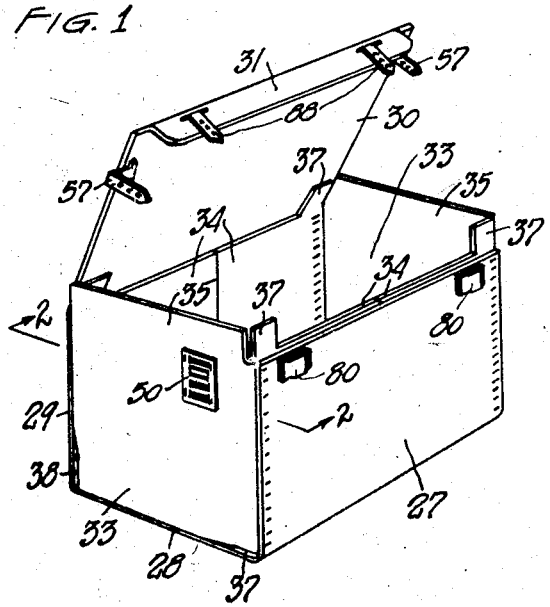
Fig. 1 is a perspective view of one embodiment of my invention.

Referring to the drawings, which illustrate the preferred embodiment of the invention, and particularly to Figs. 1, 2, 10 and 11, the numeral 25 (Fig. 11) designates an elongated blank formed of desired fiber board or the like having a plurality of spaced transverse fold lines 26 defining a front panel 27, bottom panel 28, back panel 29, and top panel 30. Blank 25 has a narrow tongue 31 formed at one end projecting from top panel 30 and of a length less than the width of the blank. A pair of complementary end blanks 32 (Fig. 10) are shaped and folded to form an end panel 33 centrally thereof, complementary reinforcing panels 34 at each end of the blank and aligned with panel 33, narrow top and bottom flanges 35, 36 aligned with panel 33, three corner tabs 37, and a fourth corner tab 38. The three corner tabs 37 are defined by slots 39 extending parallel to each other, and the other tab 38 by a slot 40 perpendicular to slots 39.

Figure 2:
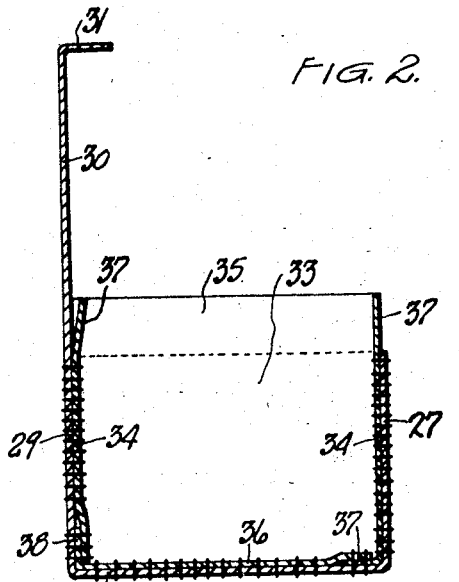
Fig. 2 is a vertical transverse sectional view taken on line 2—2 of Fig. 1.

In constructing the box as illustrated in Figs. 1 and 2, one of the reinforcing panels of each of two complementary blanks 32 is superimposed on the inner face of front panel 27 of blank 25 and the parts are stapled together adjacent the vertical edges of panel 27; thence blanks 25 and 32 are folded with tab 37 of blank 32 underlying flange 36 and the latter bearing on the margin of the inner face of bottom panel 28 of blank 25 and these parts are then stitched together; and thence the blanks are again folded to position tab 38 behind reinforcing panel 34 which is registered with back panel 29 and these parts are in turn stitched together. When this operation is completed at both box ends, the box of Figs. 1 and 2 is completed. The reinforcing panels 34 form liners at the long front and back panels of the box to materially strengthen the same, the vertical edges of the front and back panels are reinforced by stitching of panels 34 thereto, the end margins of bottom panels 28 are similarly reinforced by stitching of flange 36 thereto, and the two lower corner tabs 37 and 38 serve to connect the reinforcing panels 34 with flange 36 to rigidify the same and further reinforce the lower box corners to constitute the folded and stitched end blanks effective reinforcing end frame works for the box. The perpendicular arrangement of the slots 39 and 40 defining the lower corner tabs 37 and 38, respectively, permits folding thereof in the direction in which the immediately preceding stitching has been done without requiring manipulation of the work or difficult folding operation. In other words, referring to Fig. 10, after the left panel 34 has been stitched to panel 27 from top to bottom the flange 36 may be folded inwardly, panel 33 then folded perpendicular to 34, and left lower corner tab 37 folded under the end of flange 36, whereupon stitching of flange 36 and panel 28 may be accomplished; and then the other flange 34 may be folded and corner tab 38 folded thereagainst to permit completion of stitching of the same to panel 29. This is an important feature of my box construction from the standpoint of simplicity of manufacture for the lapped corner arranged. It will be understood, of course, that this arrangement may be utilized whether the stitching is done from front to back, or the reverse; and that the corner tabs may be positioned exposed at the interior of the box.

Another important feature of this construction is that when top panel 30 is folded flat on the box, it is held against inward dislocation by upper tabs 37 and flanges 35, and also by front liner panels 34 by virtue of the insertion of tongue 31 between said liner panels 34 and front panel 27. When the box is being filled, the upper corner tabs 37 and flanges 35 may be positioned to support each other substantially vertically, and also to hold top panel 30 of the box open, so that the box opening is of a size substantially conforming to the horizontal cross sectional area of the box interior, and a unitary object of a size to fit snugly in the box may easily be inserted therein without interference from said top 30, flanges 35 and corner tabs 37.

The box illustrated in Figs. 5 and 6 is constructed from the blanks illustrated in Figs. 11 to 13. The end blanks 32' for this construction are the same and bear the same reference numerals as that in Fig. 10 of the previously described construction, with the exception that the parts stitched to front and back panels 27 and 29 constitute flanges 34', instead of the liner panels previously described. The manner in which these panels form a reinforcing box end framework is best illustrated in Fig. 21 which also illustrates the positioning and length of the width stitching staples 41 with reference to the width of flanges 34' and 36. This feature is important since it leaves the inner edges of front flanges 34' free to serve as retainers between which and front panel 27 the ends of tongue 31 of top panel 30 may be inserted and positioned when the box is closed. All of the advantages of the box of Figs. 1 and 2, with the exception that the liners for front and back vertical box walls are eliminated, are incorporated in the box of Figs. 5 and 6, which is intended for lighter duty, or for smaller size embodiments, than the preceding construction.

A box having the same advantages and principle of construction as that shown in Figs. 1 and 2 is illustrated in Fig. 20. The difference between the two constructions resides solely in the construction of end blanks. Specifically, in the left end blank 132 (Fig. 22), the reinforcing liner end panel 42 at the box front extends substantially the full width of the box, and in the right end blank 132' a comparatively narrow flange 43 is provided at the box front; one of the flanges 34 as in Fig. 10 being provided for the back liner on each blank. This provides a unitary liner at the box front for increased strength, and which may be anchored at both vertical margins to more effectively support the box top at its free end against inward dislocation when tongue 31 is inserted between said liner panel 42 and front panel 27. A similar construction may be employed at the back of the box if desired, but its function at that point is obviously limited to slight strengthening of the rear box wall. It will be seen from Fig. 20 that the lapping of the end of liner 42 of the left blank over flange 43 of the right blank provides a full width opening at 44 at which insertion of tongue 31 may be initiated and thence readily completed by the progressive spreading apart of liner 42 from front panel 27 toward the left in Fig. 20.

It will be noted that each of these embodiments of box structure utilize the basic features of smooth exterior surface, full sized top opening, and rigid end frame work provided by the lapped relation of interconnected corner tabs and projecting flanges or liner panels of the end blanks secured to the main blank to give reinforced corners and reinforcement at all box edges.

Figure 3:
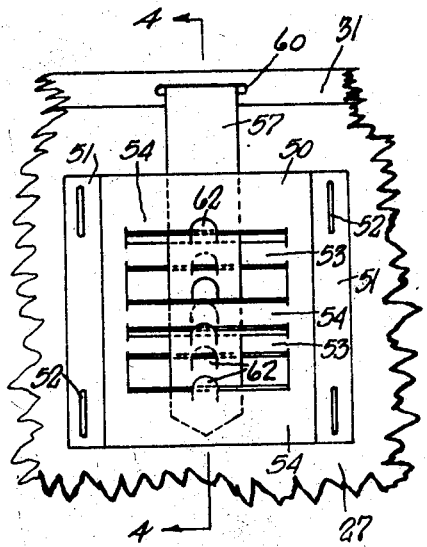
Fig. 3 is a fragmentary front elevation of the box and locking means therefor.
Figure 4:
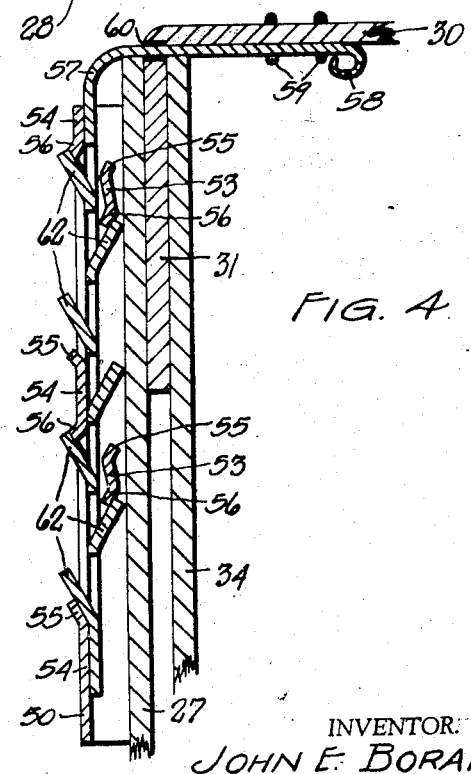
Fig. 4 is a fragmentary sectional view taken on line 4—4 of Fig. 3.
Figure 16:
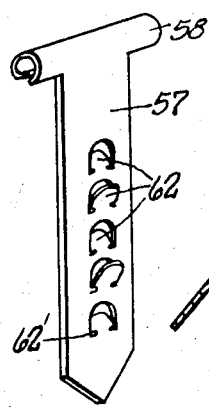
Fig. 16 is a perspective view of a modified form of latching tongue.
Figure 17:
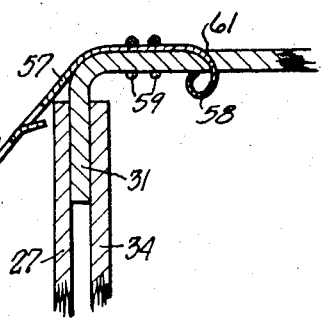
Fig. 17 is a fragmentary vertical sectional view illustrating the latching tongue of Fig. 16 applied to a box.

Various embodiments of self-acting latching means for the box have been illustrated. Each has been designed to prevent pilfering by exposing any tampering or release. One embodiment of such latching means is shown as applied at the end of the Fig. 1 box construction and as applied at the box front in Figs. 3, 4 and 16. This embodiment utilizes a latching element comprising a metal plate 50 having rearwardly off-set vertical marginal portions 51 fixedly secured to a vertical wall of the box by staples 52. The central portion of plate 50 has a plurality of vertically spaced horizontally extending slots formed therein forming a plurality of horizontal bars, of which bars 53 are inwardly off-set from alternate bars 54. Each of said bars, except the top one, has an upper angularly bent flange 55 bent in opposite direction to the adjacent bar, i. e. flanges 55 of bars 53 are bent inwardly, and those of bars 54 are bent outwardly. Each of said bars, except the bottom one, has a second angularly bent flange 56. An elongated strap or tongue 57 is secured to the box top 30. This strap is preferably provided with a rolled end 58 of greater width than itself. The strap may be secured at the under side of the top by staples 59 adjacent rolled end 58, and extending through a slot 60 in tongue 31 as illustrated in Figs. 3 and 4; or may be secured at the upper face of the box top by staples 59 and extending through a slot 61 in spaced relation to the edge of the box top for engagement of rolled end 58 at the under face of top 30 as illustrated in Fig. 17. In both arrangements the enlarged rolled end insures solid anchoring of the strap to the top against longitudinal stress or pull. The main body portion of the strap which is vertically bent along the vertical box wall has a plurality of locking tabs 62 cut out therefrom with the alternate tabs oppositely bent and their free ends uppermost. The locking tabs 62 are notched at 62' to weaken the same, whereby they break when tampered with and hence expose pilferage. The straps 57 are adapted to be inserted between bars 53 and 54 of plate 50, guided by the upper flanges 55 of each. As the locking tabs 62 slide between said bars they are inwardly spring pressed, and upon passing the lower edges of the bars they spring outwardly to engage lower flanges 56 of said bars in a manner to prevent upward return withdrawal movement of said straps. The tongues 62 are so arranged and proportioned to bars 53 and 54 that several tabs engage bars of both sets. It will be seen that this construction permits breaking of the seal by severing the straps 57, which is immediately detected if unauthorized. The several locking interengagements between tabs 60 and the rearwardly offset bars 53 are not accessible for tampering, and hence no unauthorized breaking of the seal without exposure is possible.

Figure 19:
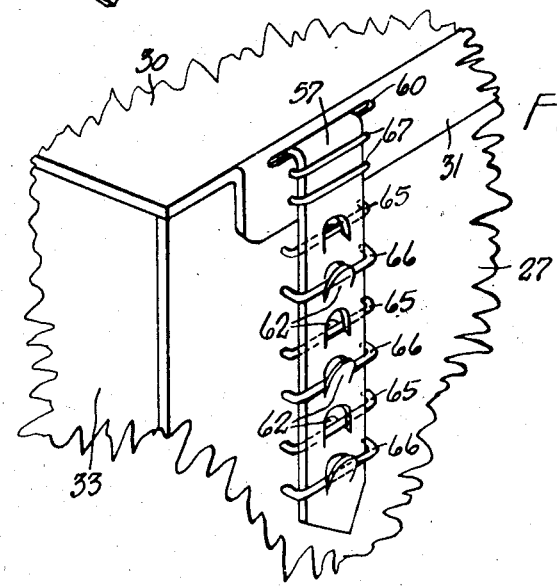
Fig. 19 is a fragmentary perspective view illustrating the latching construction of Fig. 9 applied to the front of a box whose top tongue is positioned outwardly of the box front.

The same type of latching tongue or strap 57 having alternate oppositely bent tabs 62 may also be utilized in the embodiment illustrated in Figs. 9 and 19, wherein a plurality of vertically spaced horizontal staples are secured to the vertical box wall with alternate staples 65 positioned close to said box wall, as 27, and the intermediate staples 66 spaced from said wall, whereby the outwardly bent tabs 62 may engage under staples 66 and the inwardly bent tabs may engage under staples 65, while the body of said strap 57 weaves between said staples. This construction relies for effectiveness upon normal taut condition of the strap, without play which would permit manipulation of the strap sufficient to disengage all of the tabs. In the Fig. 19 construction, strap 57 passes through slot 60 in tongue 31, and said tongue is positioned at the outer face of front panel 27, staples 67 are preferably employed to secure the vertical run of said strap to tongue 31.

Figure 18:
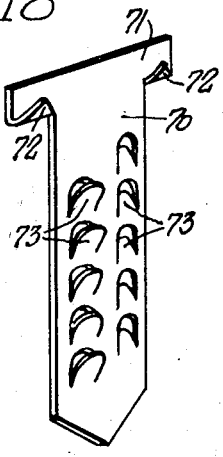
Fig. 18 is a perspective view of another modified form of latching tongue.

A slightly modified construction of locking tongue or strap adapted for the same applications as strap 57 is that numbered 70 and illustrated in Fig. 18. This strap has an enlarged rectangular end 72 whose lower corner portions 72 are return bent to provide a blunt bearing edge. Strap 70 is of width sufficient to provide two longitudinal rows of spaced angularly bent locking tabs 73, the tabs in each row extending in the same direction and opposite the direction of those in the other row. The tabs in the two rows are also preferably arranged in staggered or transversely disaligned relation. This construction has the advantage of giving a greater number of tabs per unit length of the strap without in any way weakening the same.

Figure 14:
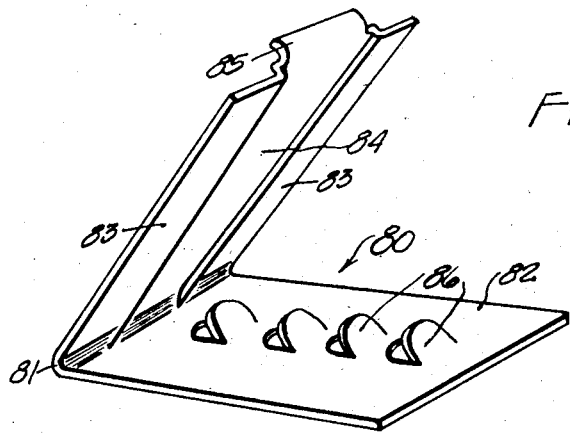
Fig. 14 is a perspective view of one embodiment of latching element.
Figure 15:
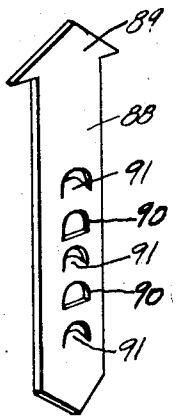
Fig. 15 is a perspective view of a locking tongue usable with the latching element of Fig. 14.

Another very effective sealing arrangement is illustrated in Figs. 7 and 8, being formed from the parts illustrated in Figs. 14 and 15. The latching element 80 (Fig. 14) comprises an elongated metal plate transversely centrally return bent at 81 to provide an inner flat part 82, and an outer part 83. Part 83 has a longitudinal central outward off-set portion 84 from whose free end projects an outwardly angularly bent flange 85. A plurality of longitudinally spaced, centrally positioned, aligned tabs 86 are cut from part 82 and angularly inwardly bent with their free ends extending in the direction of bend 81. The plate is fully return bent, with the margins of part 83 in face contact with part 82, and staples 87 securing both parts to a vertical box wall, as 27. It will be seen that member 80 thus has a central passage, closed at its lower end, provided by off-set 84, into which passage tabs 86 project. Strap 88 (Fig. 15) having enlarged end 89 is particularly adapted for use with member 80. A plurality of longitudinally spaced openings 90 are formed in strap 88, and a plurality of angularly bent cut out tabs 91 are provided in alternate aligned relation to openings 90 with their free ends extending in the direction of head 89. Strap 88 is stapled to top 30 by staples 92 adjacent head 89 to prevent longitudinal and transverse displacement.

In use, the strap 88 is longitudinally inserted in the passage provided by off-set 84 of the latching member 88, being guided thereby, tabs 91 snap over tabs 86 to interlock therewith, and tabs 86 also entering strap openings 90. In this construction the operative interlocking elements are fully concealed and inaccessible, making a very effective and positive tamper-proof seal. Also, should a temporary seal be desired, the same can be effected by hooking one of the tongues 91 of the strap 88 on flange 85 of the locking member, the same being obviously readily releasable when desired.

Each embodiment of these seals has in common with the others the feature of inaccessibility of at least some of the interlocks between locking tongue and locking member, when said interlock is effected exteriorly of the box per se. They provide simple, inexpensive, positive seals, applicable between the top and any vertical wall of the box and easily applied to the box and easily and quickly sealed without necessity for stapling or other machine operated sealing after the box is filled and closed. Any tampering with these seals is immediately exposed, and hence pilferage is discouraged and prevented. It will be understood that the sealing means may be applied at the interior as well as the exterior of the box.

I claim:

1. A preformed box comprising integral front, bottom, back and top, said top having a tongue projecting therefrom, independent ends secured to said front, bottom and back, said ends each having a vertical flange secured to the inner face of said front in spaced relation to the inner edges of said flange, said tongue being insertible in said box in engagement with the inner face of said front with its ends seating between and frictionally gripped by said flanges and said front and its lower edge extending below the uppermost point at which said flange and front are secured.

2. A preformed box comprising integral front, bottom, back and top, independent ends secured to said front, bottom and back, said ends each having a vertical flange, means securing said flanges to the inner face of said front in face engagement therewith, said top having a tongue projecting from its free edge and terminating in spaced relation to the ends of said edge, the ends of said tongue being insertible between and frictionally held by the box front and said vertical flanges inwardly of said securing means with the lower end of said tongue extending below the uppermost points at which said front and respective flanges are secured.

3. A preformed shipping box having integral front, bottom, back and top walls, and end walls, each side of which has a marginal flange extending substantially the length thereof and corner tabs formed by extensions of said flanges, some of said flanges and tabs being arranged in overlapping relation and secured to each other and to the margins of the front, bottom and back of the box to form a three dimension end reinforcement for the box at the vertical and bottom edges of the box and triple thickness lower box corners at which all thicknesses are secured together, said last named tabs extending in the same perimetrical direction whereby one is horizontal and the other vertical, the upper corner tabs and flange of each end wall folding inwardly in overlapping horizontal relation to reinforce the box top and upper box corners.

4. The construction defined in claim 3, wherein at least one flange of one end is enlarged to form a liner element.

5. The construction defined in claim 3, wherein two flanges of each end are enlarged to form vertical liners for said front and back.

6. A box having interconnected front, back and end vertical panels and a bottom and a folding top and a unitary skeleton frame structure reinforcing the end panels and comprising marginal flanges bent perpendicularly to said end panels and to each other, and means securing said flanges together and to the other panels and bottom at the inner faces thereof in the manufacture of the box, said top having a tongue at its free end shorter than the front panel and the spacing of the securing means at opposite box ends, longer than the spacing between the flanges secured to said front panel, and wider than the spacing of the uppermost securing means from the upper edge of the front panel whereby its ends may seat between the front panel and the flanges secured thereto.

7. A preformed box comprising integral front, bottom, back and top, and independent ends each having integral panels forming vertical liners at front and back and a marginal bottom flange, means securing said bottom flange to said liner panels at its ends, said flanges and liner panels being secured to the margins of the front, bottom and back and constituting three dimension box reinforcements at each end thereof, the free end of said top having a tongue adapted to be confined between the front and the front liner.

8. A preformed box comprising a blank folded to form a bottom and two side walls, independent ends having integral marginal flanges at least at each of three sides thereof and extending substantially the length thereof and a pair of corner tabs forming integral extensions of adjacent flanges, said flanges and tabs being folded perpendicular to said end and to each other and secured to the inner margins of the bottom and side walls with said tabs positioned between a flange and the box part to which the flange is secured, whereby the exterior surfaces of the box are smooth and said flanges define continuous substantially smooth reinforcements adjacent the ends, said tabs extending from their respective flanges in the same perimetrical direction and secured respectively to the bottom and one side wall, whereby one is horizontal and the other is vertical.

JOHN E. BORAH.